United States Patent [19]

Muska

[11] 3,984,993

[45] Oct. 12, 1976

[54] PRODUCTION OF A REFRIGERANT SLURRY BY CONTROLLED VENTING AND AGITATION OF A CARBON DIOXIDE BODY

[75] Inventor: Allen V. Muska, Berkeley Heights, N.J.

[73] Assignee: Airco, Inc., Montvale, N.J.

[22] Filed: June 24, 1974

[21] Appl. No.: 482,116

Related U.S. Application Data

[63] Continuation of Ser. No. 258,962, June 2, 1972, abandoned.

[52] U.S. Cl. .................................. 62/10; 62/45; 62/50; 62/76
[51] Int. Cl.² ................................................. F25J 1/00
[58] Field of Search .................. 62/8, 9, 10, 11, 12, 62/35, 45–47

[56] References Cited
UNITED STATES PATENTS

| | | | |
|---|---|---|---|
| 1,877,180 | 9/1932 | Jones | 62/10 |
| 1,884,313 | 10/1932 | Small | 62/10 |
| 3,376,709 | 4/1968 | Dickey et al. | 62/12 |
| 3,443,389 | 5/1969 | Townsend et al. | 62/10 |
| 3,660,985 | 5/1972 | Tyree | 62/10 |

*Primary Examiner*—Frank W. Lutter
*Assistant Examiner*—Frank Sever
*Attorney, Agent, or Firm*—David L. Rae; H. Hume Mathews; Edmund W. Bopp

[57] ABSTRACT

This invention relates to a novel carbon dioxide product comprising a pumpable slurry consisting of finely divided particles of solid phase carbon dioxide dispersed in liquid phase carbon dioxide in which the solid particles are free flowing, i.e. do not agglomerate on standing for periods of time sufficient to permit beneficial commercial use of the product. The slurry is produced by withdrawing gaseous carbon dioxide at a controlled rate from a vessel containing liquid carbon dioxide at the temperature and pressure conditions of the triple point while vigorously agitating the liquid, to produce solid carbon dioxide particles in the liquid. The rate of formation of the solid is controlled to produce small, finely divided particles of solid carbon dioxide rather than large pieces.

16 Claims, 6 Drawing Figures

PRODUCTION OF A REFRIGERANT SLURRY BY CONTROLLED VENTING AND AGITATION OF A CARBON DIOXIDE BODY

This is a continuation of application Ser. No. 258,962, filed June 2, 1972, now abandoned.

This invention relates to a novel carbon dioxide product and to the method by which it is manufactured.

In accordance with the present invention, finely divided, particulate, solid phase carbon dioxide is produced as a dispersion in liquid carbon dioxide to form a pumpable slurry. Although the solid particles in the slurry may settle on standing to form a thicker slurry beneath a layer of clear liquid, this thicker slurry flows easily and the finely divided solid particles do not agglomerate on standing.

Heretofore carbon dioxide ($CO_2$) has been commercially available only in any one of its three phases; i.e. as compressed gas, as liquid at superatmospheric pressure, or in solid phase, usually in block or pellet form and referred to colloquially as "dry ice". While carbon dioxide in each of these forms has great commercial value and utility, no one of them is ideally suited to derive maximum advantage of carbon dioxide as a refrigerant. For example solid phase carbon dioxide contains about twice the refrigeration value of a like weight of liquid, but solid phase material does not lend itself to economical and convenient materials handling. It is much preferred to handle fluids that can be piped and pumped from point to point rather than to handle blocks of solid. Finely divided solid $CO_2$ agglomerates on standing and cannot be handled as a free flowing dry powder. Accordingly carbon dioxide is now widely used for refrigeration by expanding liquid from superatmospheric pressure (typically 300 p.s.i.g.) to atmospheric through an expansion nozzle (snow horn) to form solid particles (usually referred to as snow) and cold gas. While some useful refrigeration is derived from the cold gas, it is the snow that is desired as the effective refrigerant and by expansion of liquid only about 45% of the total weight of $CO_2$ passed through the nozzle is converted to solid.

The present invention therefore has as its primary object the production of a novel carbon dioxide product comprising a pumpable slurry of the solid and liquid phases of carbon dioxide which retains most of the thermodynamic advantage of solid $CO_2$ and at the same time adapts to convenient material handling methods.

The slurry of this invention provides a mixture of solid and liquid carbon dioxide with the solid being in the form of finely divided dispersed particles so that the mixture is fluid and pumpable. It is a two-phase mixture that can exist at any pressure and temperature along the solid-liquid equilibrium curve for carbon dioxide as shown in FIG. 1, which is a phase diagram for carbon dioxide. The lowest pressure for liquid on this equilibrium curve is 60 p.s.i.g. (75 p.s.i.a.) and the lowest temperature is $-70°$ F, which pressure and temperature occurs at the triple point, the only point on the curve where all three phases of carbon dioxide, i.e. gas, liquid and solid, can exist simultaneously. The solid particles in the slurry show little or no tendency to agglomerate on standing.

It is desired to have as high a concentration of solids in the slurry as possible and still have a pumpable slurry. The proportion of solid carbon dioxide in the slurry of this invention can vary over a wide range up to about 85% by weight and still exist as a pumpable fluid. Generally, the solids concentration is in excess of about 10% by weight. This 10% product is a watery substance resembling skim milk in appearance and as the solids increase the appearance becomes that of a thicker more viscous white fluid.

A mixture of liquid $CO_2$ and solid $CO_2$ crystals is known as a transitory intermediate during the production of solid $CO_2$ blocks by evaporation of liquid at the triple point. Typical prior patents disclosing such a method of making solid $CO_2$ blocks are Small U.S. Pat. No. 1,884,313 and Jones U.S. Pat. No. 1,877,180. However, since the object of these prior art processes was to make dense compacted blocks of solid $CO_2$ no steps were taken to cause the solid particles to remain in the liquid as dispersed discrete particles that do not agglomerate on standing, and no such result was achieved.

There are two major advantages for refrigeration purposes in supplying carbon dioxide as a slurry instead of the conventional liquid carbon dioxide at 300 p.s.i.g. The higher density of slurry (11.04 lb./gal. for slurry containing 50% solids at the triple point pressure of 60 p.s.i.g. vs. 8.48 lb./gal. for 300 p.s.i.g. liquid) allows a greater amount (weight) of $CO_2$ to occupy a given volume (therefore more referigeration per unit volume). Also since solid $CO_2$ contains more refrigeration than a like weight of liquid, its presence in the slurry contributes to a higher refrigeration content per pound of this novel carbon dioxide product. The refrigeration content of slurry and 300 p.s.i.g. liquid can be compared by noting that each pound of carbon dioxide slurry containing 50% weight solids at 60 p.s.i.g. can be converted into 0.77 pounds of carbon dioxide "snow" at $-109°$ F and 0 p.s.i.g. while one pound of 300 p.s.i.g. liquid yields 0.46 pounds of such "snow". This relationship is of more than academic interest because $CO_2$ when used as a refrigerant is generally used as solid blocks, pellets or snow. Expressed differently, a slurry containing 50% by weight of solid contains about 156% of the refrigeration value of a like weight of 300 p.s.i.g. liquid. Similarly a 10% solids slurry contains about 131% and an 85% solids slurry contains about 178% of the refrigeration capacity of pure liquid.

A pumpable slurry of finely divided, discrete particles of solid $CO_2$ in liquid $CO_2$, in a form and state suitable for use or sale on a commercial scale, was unknown prior to the present invention. However in the broadest sense it is old to provide a slush or slurry of solid particles in liquid of the same or different composition for refrigeration and other purposes. The provision of solid particles of ice in water is of couse a notoriously old method for maintaining the water at or near the freezing temperature as the body absorbs heat. Until all the ice is melted the heat absorbed changes the solid to liquid without raising the liquid temperature. Similarly, but in a totally different frame of reference, it is now known to prevent premature evaporation of liquid hydrogen used as a rocket fuel by storing the hydrogen as a slush, i.e. a mixture of solid particles of hydrogen dispersed in liquid hydrogen at cryogenic temperatures. As heat leaks into such a system solid is converted to liquid and until all of the solid is melted no evaporation takes place and it is not necessary to valve off any of the precious and hazardous fuel. In both the water and hydrogen systems referred to above the solid phase is dispersed in the liquid primarily to provide a heat sink that would, in effect, provide self-refrigeration and maintain the sub-ambient temperature of the body of liquid even though heat is absorbed by the body as a whole. While a similar benefit is obtained from the $CO_2$ slurry of the present invention a primary purpose of the invention is to provide a high percentage of solids at the end point of use, usually at atmospheric pressure, where $CO_2$ cannot exist as liquid at any temperature. In the hydrogen and water examples the slurry provides cold liquid at the point of end use. In the present invention the slurry provides a maximum amount of solid material at the point of end use.

Elsewhere in the prior art U.S. Pat. No. 3,393,152 to Smith and Townsend, assigned to the same assignee as the present invention, discloses a composition consisting of finely divided particles of solid $CO_2$ in a medium of liquid nitrogen. In that patented invention too, refrigeration capacity of the solid $CO_2$ enhances the refrigeration capacity of the liquid nitrogen without impairing its charcteristic as a fluid that can be piped and pumped. The liquid nitrogen can, of course, exist at the point of end use as a boiling liquid at atmospheric pressure which vaporizes first leaving the solid $CO_2$ behind to sublime. The total refrigeration capacity of this product is greater than that of liquid nitrogen alone, but it delivers its refrigeration in two steps and at two temperatures, and therefore is not ideally suited to many applications. In any event it is in no way a system for increasing the yield of solid $CO_2$ from liquid $CO_2$ at the point of end use.

The present invention is a new and useful carbon dioxide product consisting of a body of liquid carbon dioxide at a pressure equal to or greater than the triple point pressure containing small particles of solid carbon dioxide as discrete free flowing unagglomerated particles, the whole composition being capable of being handled as a fluid, such as by pipes and pumps. The total refrigeration capacity of the composition is the sum of that contained in the liquid and solid components and therefore has the potential to deliver a greater amount of solid when expanded to atmospheric pressure than does a like weight of liquid alone. Since a slurry cannot readily be expanded through a nozzle with a small orifice without either clogging the orifice or straining the solids from the liquid, the slurry is preferably dispensed by a positive displacement device such as a gear or vane type pump operated as an expander rather than a pump.

Essentially the method employed to make the slurry, according to the present invention, comprises evaporating $CO_2$ from a body of liquid $CO_2$ at the triple point temperature and pressure by venting the reaction vessel to permit further vaporization of liquid. The heat absorbed from the liquid body causes the formation of solid $CO_2$ in the liquid in an amount related to the amount of vapor formed. As the solid is formed, the bath is continuously and vigorously agitated. By controlling the rate of formation of the solid carbon dioxide (by controlling the rate at which gas is vented from the system) and the agitation, a slurry is produced containing up to about 85% by weight of finely divided, particulate carbon dioxide dispersed in liquid carbon dioxide. The particulate material so formed does not show any tendency to agglomerate on standing. Carbon dioxide slurry prepared by the method of this invention flows freely and can be handled as a slurry at solid concentrations up to about 85% on a weight basis. The solid particles are relatively fine and do not agglomerate on storage. Analysis of settling rates indicated that the smallest particles are of the order of 4 microns in maximum cross sectional dimension. It is believed that still finer particle sizes can be produced according to the invention, for example by increasing agitator speeds. The solid appears to be crystalline in form. For most pumping systems particles larger than about ¼ inch (approximately 6 mm) in maximum cross sectional dimension are undesirable as lumps of this size, and larger, can more readily plug pipelines and pumps. The larger particles are considered undesirable, not only because they tend to plug the pipelines and pumps, but also because they are more difficult to retain in dispersion. The preferred range of particle size is considered to be from about 4 microns minimum to about 2 mm maximum.

The novel carbon dioxide product may be made by either a batch process or continuously. The concentration of solid in the slurry made by the batch process depends essentially on the amount of gas vented from the reactor and the heat leak into the reactor. The amount of gas vented is, of course, the product of the rate at which gas is vented from the reactor and the length of time the reaction is permitted to proceed. In the continuous process the concentration of solid depends on the liquid feed rate and the rate at which gas is vented from the reactor as will be more fully explained hereinafter. By either method the ultimate solids concentration can be increased by concentrating the solids in a vessel other than the reactor and recycling excess liquid.

For a more complete description of the novel product and its methods of manufacture reference should be made to the accompanying drawings in which.

Figure 1:
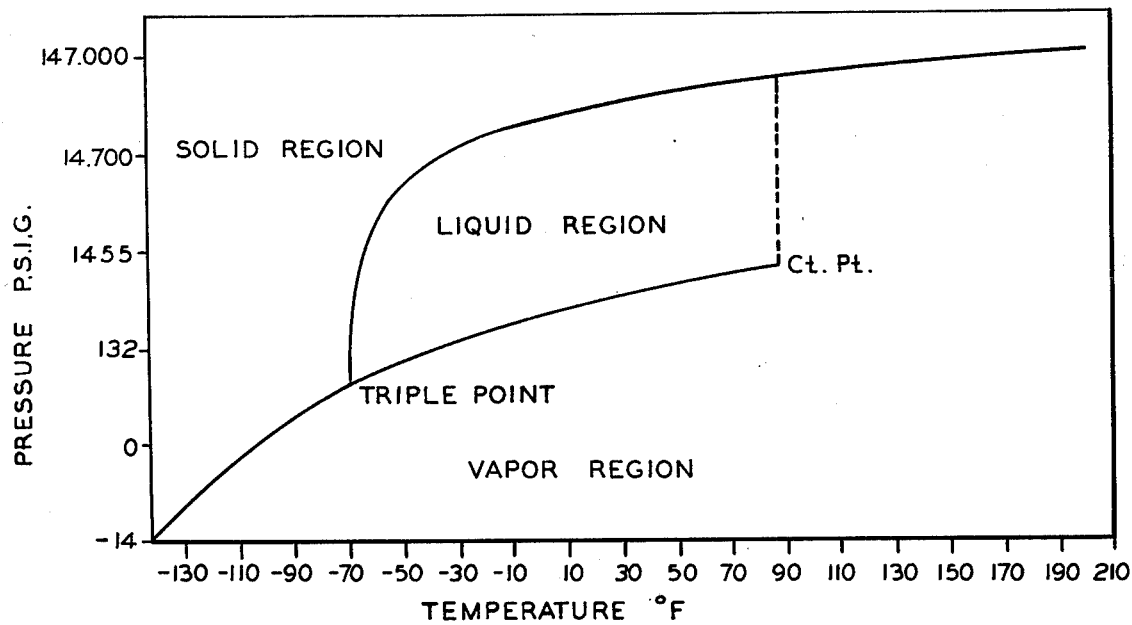
FIG. 1 is a phase diagram for carbon dioxide.
Figure 2:
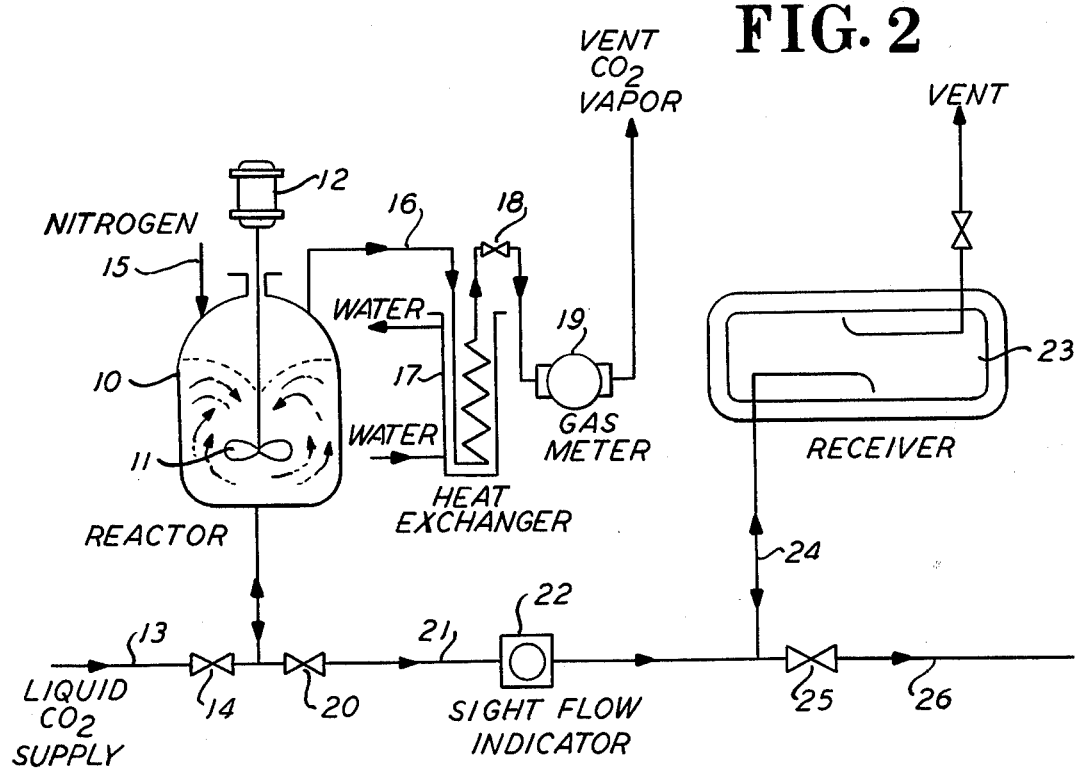
FIG. 2 is a diagrammatic showing of a batch method for the manufacture of $CO_2$ slurry of the desired novel characteristics.

A simple apparatus to carry out the novel process and produce the novel product of the present invention is illustrated in FIG. 2.

In general the equipment consists of a 50 gal. reactor 10, equipped with a propeller type agitator 11, driven by a variable speed motor 12. Liquid $CO_2$ is admitted to the reactor from a suitable supply which is typically a storage tank maintained at approximately 300 p.s.i.g. and 0° F. The liquid supply is admitted to the reactor under pressure through the supply line 13 and control valve 14. A suitably controlled nitrogen supply line 15 communicates with the head space of the reactor 10. A vapor line 16 leads from the head space of the reactor through a heat exchanger 17 and a vapor control valve 18 to a meter 19 and a vent to atmosphere. Valve 20 and discharge line 21 provide for discharge of the contents of the reactor through a sight flow indicator 22 into a receiver 23 via line 24, or alternatively direct discharge from the reactor to a point of use through valve 25 and discharge line 26.

In operation a suitable quantity of liquid $CO_2$, for example 35 gallons, is admitted to the reactor at 76 p.s.i.g. from the 300 p.s.i.g. source of supply by closing valve 20 and opening valve 14 and the vent valve 18. During the filling operation it is necessary to vent the reactor to remove displaced air, the gas generated as a result of the pressure reduction and the gas generated as a result of boil off caused by heat absorbed from the warm reactor. When the liquid level in the reactor is stabilized at the desired level, valve 14 is closed. To make a slurry according to the invention the agitator 11 is activated and valve 18 is again opened to valve off vapor and reduce the reactor pressure. When the pressure falls to the triple point pressure of 60 p.s.i.g. further venting of gas will result in the formation of solid $CO_2$ at the surface of the liquid mass and not in further pressure reduction. Any crystals of solid $CO_2$ so formed are instantly sucked below the surface and into the body of the liquid by the action of the agitator. Since the amount of solid formation is directly related to the amount of vapor generated, the volume of gas vented is carefully measured by a suitable gas meter 19 in the vent line. To get a meaningful reading from the meter 19 it is necessary to admit the gas to the meter at a suitable and known temperature. For this purpose the gas vented from the reactor is warmed in heat exchanger 17 before passing through the gas meter 19.

When the vented gas volume indicates sufficient solids have formed the valve 18 is closed and the venting stopped. The agitator 11 is then slowed down and the reactor is pressurized with nitrogen from the supply line 15 to 100 p.s.i.g. When valve 20 is opened, the slurry flows into the receiver 23 and its passage can be visually monitored through the window of the sight flow indicator 22.

Figure 5:
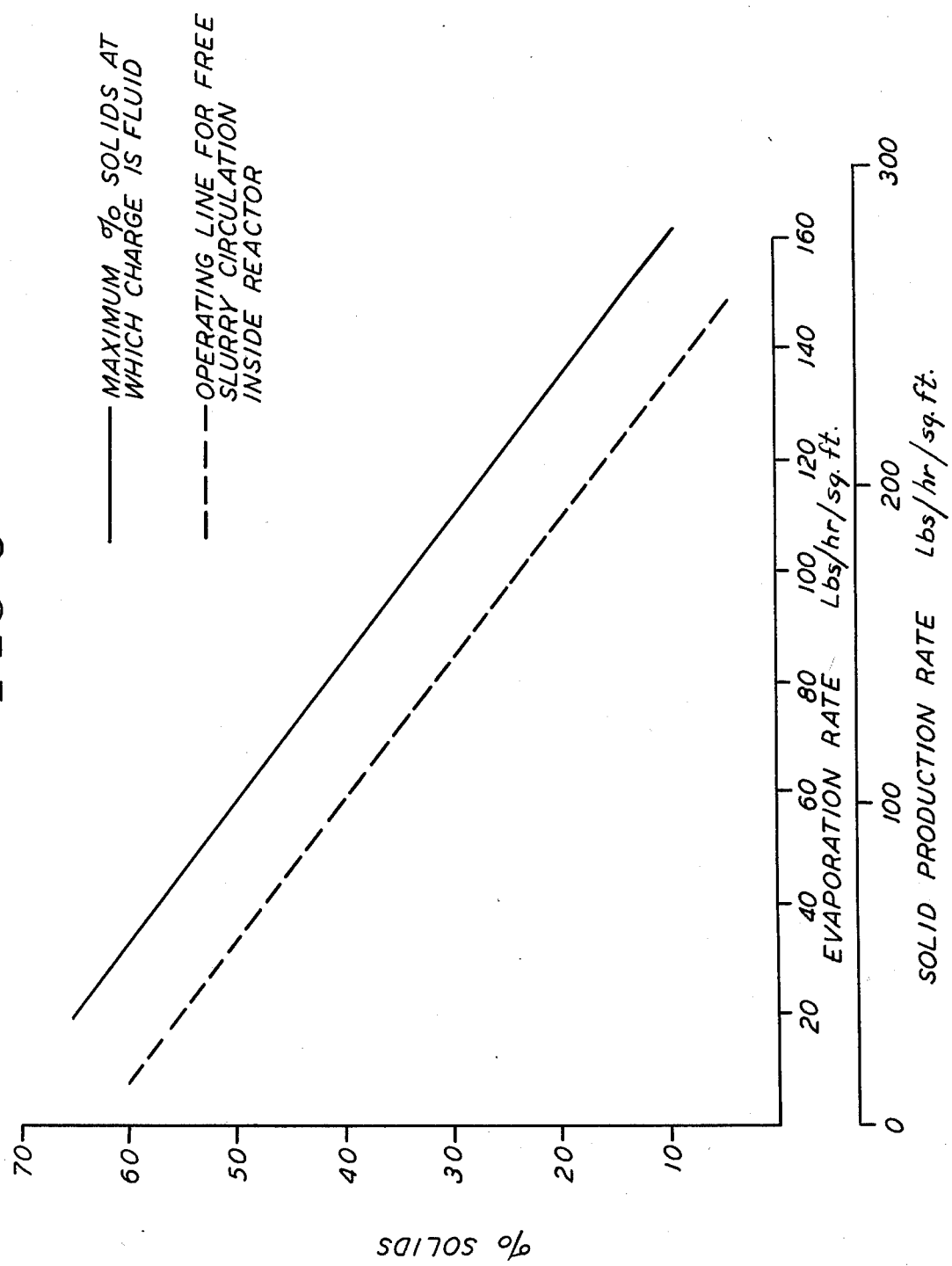
FIG. 5 is a graph showing the maximum percent solids that can be formed for different liquid evaporation rates.

In the batch method of $CO_2$ slurry preparation, such as described above, the percent solids in the solid-liquid mixture is determined in general by the amount of liquid that is vaporized and vented. However, as a practical matter, the rate at which the vapor is vented limits the maximum solid content that can be produced in a form that achieves the object of the invention, i.e. to produce a pumpable fluid. FIG. 5 relates the evaporation rate, and the related solids formation rate, to the percent solids that will circulate freely in the reactor as required to form a pumpable fluid. The evaporation rate specified in FIG. 5 is only the evaporation from the triple point condition and does not include evaporation necessary to reduce the pressure of the liquid feed to the triple point. Accordingly, while more solid can be produced in a given period of time the higher the evaporation rate, the solids concentration of the slurry that can be made will decrese as the evaporation rate increases. One reason for this phenomenon is that with increasing rate of formation of solid particles, fluffier and more porous particles are formed so that, in essence, one is able to get less solid into the slurry and have it remain in condition to circulate freely in the reactor and permit continued reaction. The bulk density in the reactor of a slurry produced with a high rate of solid formation, for example, is lower than the bulk density of a slurry produced with a low rate of solid formation.

The rate of evaporation or withdrawal of gaseous carbon dioxide from the vessel, because of its physical tie-in to the rate of solid formation provides a convenient method of define the desired rate of solid formation. In general, it is desired to maintain the evaporation rate of the carbon dioxide per unit of liquid surface area between about 200 and 250, preferably 75 to 175, pounds per hour per square foot of area. In addition to rate of evaporation the residence time of solids in the liquid in the vessel (aging) can affect the size and density of the solid particles and thus the solid concentration attainable in the slurry. In aging, the pores in each particle become filled with solid so that the material is less fluffy and the slurry is pumpable at high solids concentration. Residence times of 2 to 125 minutes, preferably 8 to 16 minutes, are suitable for this invention.

In addition to controlling the rate of solid formation, a substantial agitation is maintained in the production vessel. If no agitation is used, solid tends to form a crust that covers the liquid surface. Any method that instantly removes solids from the surface as they are formed and immerses them in the body of the liquid may be used. The problem is preferably overcome by use of mechanical agitation sufficient to prevent formation of a crust and to move the solids, as they are formed, away from the liquid surface. Agitation also prevents agglomeration of the particular solid carbon dioxide in the initial stages of the formation. Additionally, it is desired to prevent gas entrapment in the solids. In the absence of agitation, or at a slow rate of agitation, the carbon dioxide solids immediately begin to agglomerate as they are formed and undesirable large lumps are formed. Under certain conditions, it is even possible that the liquid carbon dioxide will convert to a solid block of carbon dioxide. At optimum rates of agitation, a fine slurry is made with a fast production of solids. The type of agitator used is not critical, but it is necessary to use an agitator designed to move the solids from the surface and to provide adequate shear in the slurry mass to control particle size, such as an impeller type agitator. The type of agitation and the power input of agitators will vary depending upon the size of the vessel. For a reactor 23 inches in diameter a single 8.9 inch diameter propeller driven at 420 rpm by a ⅓ HP motor has proved highly successful. For a 50 gallon reactor above about 0.003, preferably above 0.005, and particularly agitator power input about 0.008 to 0.025 HP per gallon of slurry in the reactor is suitable for this invention. Power inputs above 0.05 HP per gallon will generally be unnecessary. In all cases agitation sufficient to prevent formation of a crust on the surface of the liquid, to remove the particles from the surface as they are formed and to prevent agglomeration of the solids within the body of the liquid is necessary for the production of the slurry of this invention.

Table I contains data from five representative runs with the equipment and in the manner described above.

TABLE I

| Run | % Solids | Evap. Rate lbs/hr/ft² | RPM | Comments |
|---|---|---|---|---|
| A | 59 | 22 | 420 | Shows capability for high solids production |
| B | 57 | 41 | 420 | Transfer made after 19 hours without agitation |
| C | 14 | 134 | 420 | Evap. rate to produce maximum solids; Transfer after 2 hours settling |
| D | 25 | 96 | 420 | Representative of good reactor operation (normal operations line) |

TABLE I-continued

| Run | % Solids | Evap. Rate lbs/hr/ft² | RPM | Comments |
|---|---|---|---|---|
| E | 51 | 32 | 420 | Representative of good reactor operation (normal operations line) |

The solid content in the slurry of the present invention is such that the slurry is pumpable. The present invention contemplates slurries containing from about 10% to about 85% (by weight) solids. The higher percent solids slurries are preferably produced by concentration outside the reactor. Without agitation the solids in the carbon dioxide slurry of this invention will settle leaving a layer of clear liquid above thicker slurry with a distinct slurry-liquid interface. This clear liquid can be removed after the initial settling, which take less than 1 minute. The bulk density of the slurry increases at a slower rate. Agitation of the settled slurry quickly redisperses the solid $CO_2$ particles throughout the liquid $CO_2$ to form a substantially homogeneous slurry. The settlement phenomena can be used to produce concentrated slurries in short periods of time. The settled slurry will seldom, if ever, exceed about 85% weight solids concentration. The final solids concentration of the slurry product of this invention can, using this phenomena, become independent of the evaporation rate that was used in making the initial slurry.

A problem encountered in the operation of the reactor illustrated in FIG. 2 was the build up of solid $CO_2$ on the agitator shaft above the liquid (slurry) surface and on the reactor walls in the vicinity of the liquid-vapor interface. Heat may be added at these points to prevent the problem. This may be by heat exchange with warm liquid or by electric or other direct heating.

To overcome the foregoing problem and to demonstrate the feasibility of continuous slurry manufacture the apparatus of FIG. 2 was modified to provide for the continuous introduction of make-up liquid $CO_2$ against the wall of the reactor at the liquid vapor interface, to melt the solid that tended to accumulate at that point. As further modification a pump was placed in line 21 between the reactor and the receiver, and a flow-controlled recycle line provided from the downstream (high pressure) side of the pump to return product to the reactor at a point below the liquid surface. A screen was placed at the outlet of the reactor to prevent any inadvertent large solid particles from entering the outlet line and avoid the possibility of clogging the pump. With these modifications the apparatus of FIG. 2 was operated with the continuous introduction of liquid feed stock at a rate to maintain the liquid level in the reactor while vapor was vented as before, and product slurry was continuously transferred to the receiver or other point of end use. The residence time, and thus the solids concentration, was controlled by the proportion of product withdrawn from the reactor that was recycled.

Table II contains data from two representative runs with the equipment modified and operated as described above.

TABLE II

| Run | % Solids | Evap. Rate lbs/hr/ft² | RPM | Comments |
|---|---|---|---|---|
| AA | 10 | 126 | 420 | 30 minute continuous run |
| BB | 30 | 126 | 420 | 85 minute continuous run |

A careful analysis of forty-one batch runs and fifteen continuous runs with the apparatus of FIG. 2 revealed the following significant parameters considered essential to the production of a high solid concentration, unagglomerated, pumpable slurry. First it is necessary to provide a high degree of agitation throughout the entire body of liquid in the reactor so as to produce only fine solid particles. It is necessary to apply heat to the reactor wall at the level of the liquid vapor interface to prevent the formation of large solid particles thereon, which could then fall into the slurry and which would not necessarily be reduced to small particles thereafter. Since it is always possible that some larger particles of solid may be formed in spite of precautions to prevent this, it is necessary for continuous reliable operation to provide a screen at the outlet of the reactor to prevent inadvertently formed large particles from clogging the outlet and any downstream pump or orifice. A fine particle slurry, made in accordance with the present invention, is a pumpable fluid. However, it appears that the slurry pump suction line should be kept large enough in diameter to keep the velocity in the line below about 1 foot per second, at which rate the pressure drop in the line is insufficient to cause significant vaporization which, if present, tends to block the pump and cause some agglomeration of the solid particles.

Figure 3:
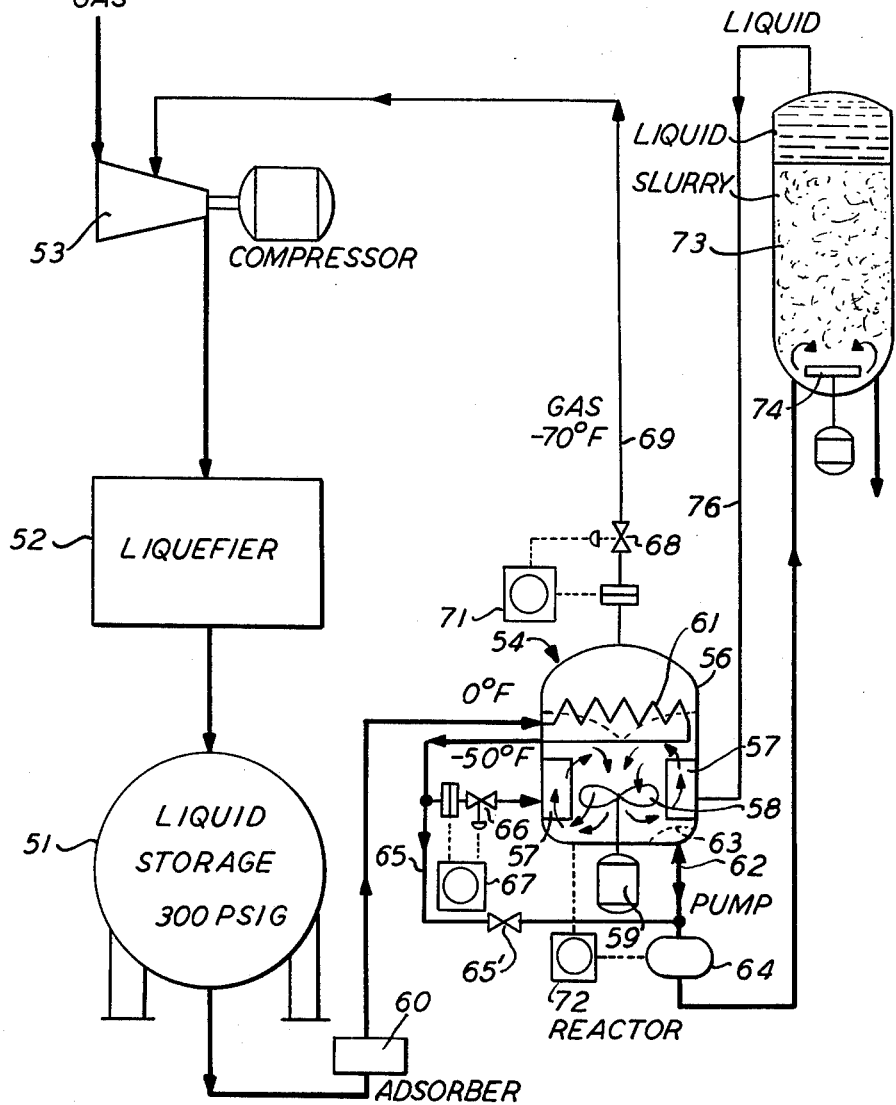
FIG. 3 is a diagrammatic showing of a continuous method for the manufacture of $CO_2$ slurry of the desired novel characteristics.

A preferred embodiment of the invention, suitable for large scale continuous production of the novel carbon dioxide product is illustrated in FIG. 3. $CO_2$ in liquid phase at 300 p.s.i.g. and 0° F is provided as starting material for the process. This can be conveniently supplied from any conventional storage facility such as tank 51 which receives liquid from a liquefier 52 to which compressed gas is supplied from a compressor 53.

Figure 3A:
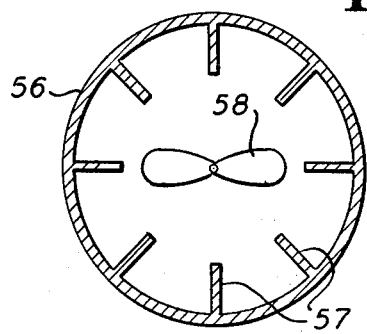
FIG. 3A is a sectional plan view of the slurry generator shown in FIG. 3.
Figure 4:
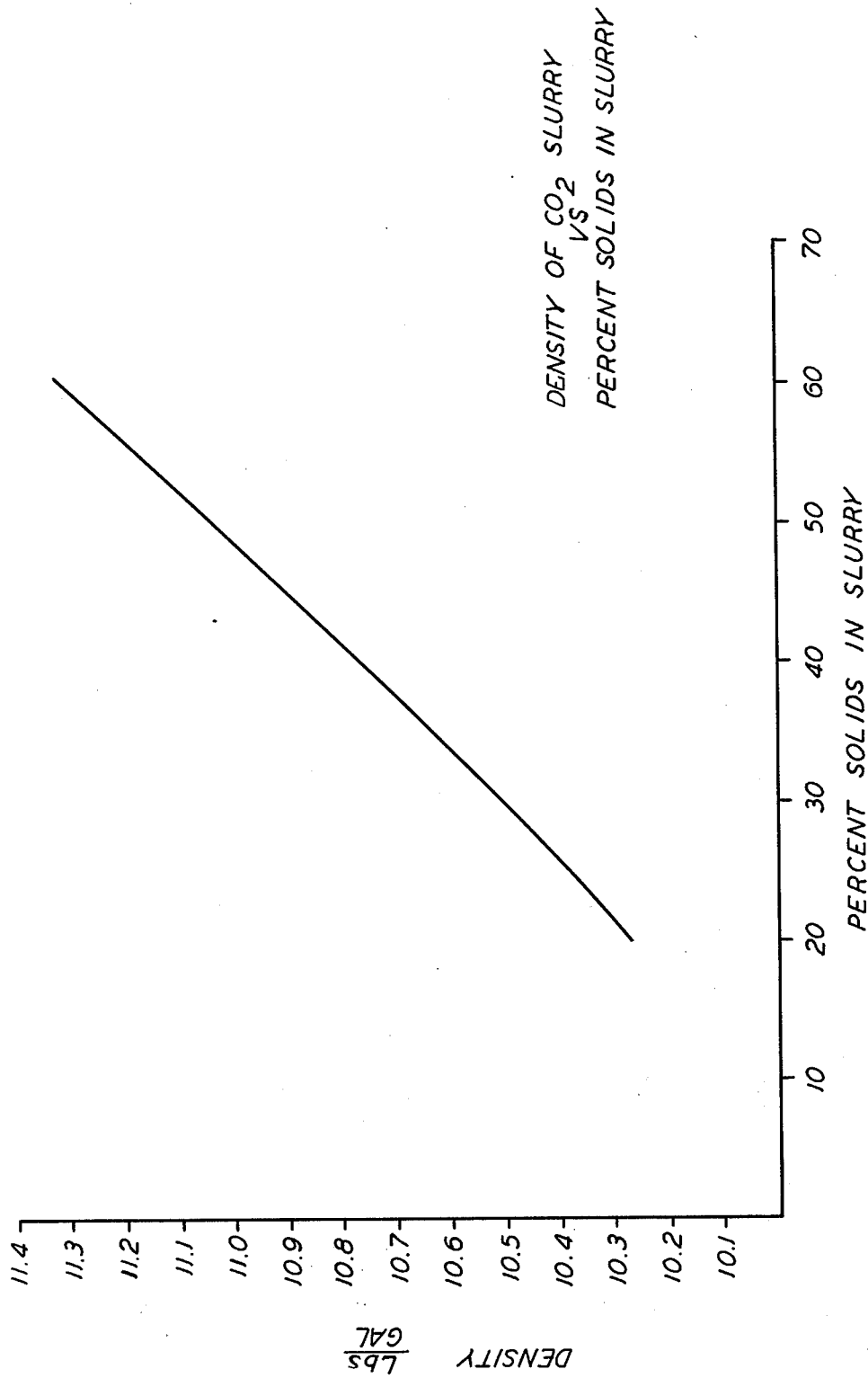
FIG. 4 is a graph showing the relationship between average density of the slurry and the percent solids contained therein.

The reactor in which the liquid is convertd to a solid-liquid slurry is identified generally by the reference number 54 and consists of a pressure vessel 56 having inwardly extending baffles 57 attached to the wall as shown in FIG. 3A, which is a sectional view along line A—A of FIG. 3. The reactor is equipped with a bottom entering agitator 58 driven by agitator motor 59 which provides sufficient agitation to generate a fine particle slurry. Location of the agitator shaft wholly within the liquid in the reactor eliminates the problem of solid $CO_2$ forming on the shaft in the vapor filled head space of the reactor. The preferred toroidal pattern of circulation in the reactor is indicated. The liquid feedstock from storage tank 51 is first passed through an adsorber 60 to remove any moisture preset and is then passed in heat exchange relation with the walls of the reactor by passing it through a suitable coil 61 affixed to the outside of the reactor vessel 56 at the level of the liquid-vapor interface. As the liquid feedstock gives up its heat from 0° F to −50° F it melts any solid deposit forming on the reactor walls in the head space. The entrance to the product withdrawal pipe 62 at the bottom of the reactor is protected by a screen 63 to prevent an occasional larger solid particle from entering the pipe 62 and the slurry pump 64 through which the slurry is discharged. Provision may be made such as by liquid line 65 and control valve 65', to admit clear liquid to the reactor to reverse flush the protective screen should it become clogged.

The liquid feed after having passed in heat exchange with the reactor wall is admitted to the reactor below the liquid surface through a flow control valve 66 actuated by a flow controller 67. This controller keeps the feed rate constant. The reactor is maintained at the triple point pressure of 60 p.s.i.g. A constant percentage of solids is formed in the reactor by evaporating liquid at a constant rate. This rate of evaporation is regulated by valve 68 in the vapor discharge line 69 which communicates with head space of the reactor. The valve 68 is controlled by the vapor flow controller 71. This cold vapor is returned to the high pressure stage of compressor 53 where it is compressed to the liquefier pressure together with the gaseous carbon dioxide feed. If desired the cold vapor can be heated before entering the compressor by passage through a suitable heat exchanger to recover the available refrigeration.

It is preferred to control the liquid evaporation rate to continuously produce in the reactor a slurry containing about 30% solids. As the percent solids are controlled by maintaining all flows constant, the flow through pump 64 is kept constant by adjusting its speed in response to the level of liquid in the reactor by a reactor level controller 72.

Thus as slurry is formed it is continuously removed from the reactor by pump 64 which delivers it to a concentrating receiver 73. The bottom of the concentrating receiver 73 is provided with a slow moving agitator 74 to assure dispersion of the solids in the liquid for delivery of the concentrated slurry to a point of storage or use. The agitator 74 does not however produce enough agitation in concentrating receiver 73 (which is preferably a pressure vessel having a relatively large height-to-depth ratio) to prevent concentration by gravitational separation of the more dense solid particles and the less dense liquid. Thus if 30% solid slurry is delivered to the concentrating receiver the solids will quickly settle out to produce a slurry having a solids concentration of the order of 60% in the bottom of the vessel ad clear liquid at the top. The clear liquid present at the top of the concentrating receiver 73 is returned to the reactor through return line 76. Residence in the concentrating receiver further enhances the density of the slurry by reason of the aging of the solid particles which takes place. It has been determined that it is more economical to continuously produce 30% solids in the reactor and concentrate them thereafter to whatever higher percentage is desired than to initially produce the higher percent solids.

To utilize fully the refrigeration capacity of the slurry of the present invention it is necessary to be able to dispense the material from its storage pressure, which in no event can be less than the triple point pressure of 60 p.s.i.g., to atmospheric pressure. The solid component of the slurry should be able to pass through the dispenser substantially without phase modification and without separation from the liquid. The liquid component, which will flash to solid and gas upon pressure reduction to atmospheric, must be able to be dispensed without the solid formation impeding the operation of the equipment. The conventional snow horn used for dispensing liquid $CO_2$ is generally not suitable for slurry dispensing. It has been found that certain positive displacement pumps, such for example as gear pumps and vane pumps, can be used as dispensers for the dispensing of the slurry product. Such a pump, to be used as a dispenser, must be operated in "reverse", i.e. as an expander delivering slurry from a high pressure to a low pressure. In so doing work is produced, thereby enhancing the refrigeration capacity of the dispensed product. This method of dispensing is described and claimed in U.S. Pat. No. 3,817,045.

I claim:

1. A process for the preparation of a pumpable carbon dioxide slurry which comprises
   venting carbon dioxide vapor from a body of liquid carbon dioxide in equilibrium with solid and vapor carbon dioxide at the triple-point pressure and temperature in a reactor to cause discrete non-agglomerated particles of solid carbon dioxide to be formed at an evaporating surface of the liquid,
   agitating said liquid carbon dioxide while venting said carbon dioxide vapor to prevent agglomeration of said discrete particles as a crust and to remove said solid carbon dioxide from said surface as non-agglomerated fine discrete particles which are submerged by said agitation in the body of said liquid thereby dispersing said discrete solid particles in said liquid to form a solid liquid slurry, and
   removing the solid-liquid slurry so formed from the reactor.

2. A process as defined in claim 1 for the preparation of a pumpable carbon dioxide slurry wherein the particle size of said particulate carbon dioxide dispersed in liquid carbon dioxide is controlled by the rate of said agitation.

3. A process for the preparation of a pumpable carbon dioxide slurry which comprises
   venting carbon dioxide vapor at a controlled rate from a body of carbon dioxide liquid in equilibrium with solid and vapor carbon dioxide at the triple-point pressure and temperature in a reactor to cause discrete non-agglomerated particles of solid carbon dioxide to be formed at an evaporating surface of the liquid,
   agitating said liquid carbon dioxide while venting said carbon dioxide vapor to prevent agglomeration of said discrete particles as a crust and to remove said solid carbon dioxide from said surface as non-agglomerated fine discrete particles which are submerged by said agitation in the body of said liquid, thereby dispersing said discrete solid particles in said liquid to form a solid-liquid slurry,
   continuing said venting of said vapor and said agitation until a predetermined ratio of solid to liquid is formed in the reactor, and
   removing the solid-liquid slurry so formed from the reactor under pressure as a two-phase mixture.

4. A process according to claim 3 in which heat is supplied to the reactor wall to prevent the adherence of solid carbon dioxide thereto.

5. A continuous process for the manufacture of a slurry of solid carbon dioxide particles in liquid carbon dioxide which comprises
   continuously delivering liquid carbon dioxide to a superatmospheric pressure reactor containing liquid and vapor in equilibrium at the triple-point pressure and temperature, continuously venting said vapor from the reactor to cause additional liquid to vaporize to maintain the equilibrium condition and thereby remove heat from the body of liquid to cause a related amount of liquid to change from the liquid to solid phase to form discrete, non-agglomerated particles of solid carbon dioxide, continuously agitating said liquid carbon dioxide while venting said vapor to prevent agglomeration of said discrete particles as a crust and to remove said solid carbon dioxide from said surface as non-agglomerated fine discrete particles which are submerged by said agitation in the body of said liquid, thereby dispersing said discrete solid particles in said liquid to form a solid-liquid slurry, continuously removing a portion of the solid and liquid mixture from the reactor under pressure and passing said removed mixture to a storage vessel, and continuously recycling a portion of the removed mixture from said vessel to said reactor to provide for further evaporation of liquid in said reactor and concentration of the solids content in said vessel, with the remaining portion of said removed mixture constituting the product slurry.

6. A process according to claim 5 in which the liquid carbon dioxide continuously delivered to the reactor is delivered from a supply at a temperature above the reactor temperature and is passed in heat exchange with the wall of the reactor in the vicinity of the liquid-vapor interface before being admitted to the reactor below the liquid-vapor interface.

7. A process according to claim 5 in which the portion of the removed solid and liquid mixture returned to the reactor is substantially clear liquid derived from decanting the removed solid-liquid mixture in the storage vessel.

8. A process according to claim 5 in which vapor vented from the reactor is recompressed and reliquefied for delivery to the reactor with fresh make-up liquid.

9. A process according to claim 5 in which the liquid carbon dioxide continuously delivered to the reactor is passed through an adsorber to remove water present as an impurity.

10. A method for producing a refrigerant composition comprising a pumpable slurry consisting essentially of finely divided particles of solid phase carbon dioxide dispersed in liquid phase carbon dioxide comprising, withdrawing vapor phase carbon dioxide at a controlled rate from a vessel containing liquid phase and vapor phase carbon dioxide at the carbon dioxide triple-point pressure to cause discrete non-agglomerated particles of solid phase carbon dioxide to be formed at an evaporating surface of the liquid, while continuously agitating the liquid to prevent agglomeration of said particles as a crust, said vapor withdrawal rate being controlled to produce a fluid and pumpable slurry of from 10% to 85% by weight of finely divided particles of solid carbon dioxide dispersed in the liquid, and said agitation being sufficient to remove said particles of solid from said evaporating surface to a position under the surface as said particles are formed while preventing agglomeration of the solid particles within the body of liquid.

11. The method of claim 10 wherein the evaporation rate of the liquid phase carbon dioxide produces solid at a rate between about 10 and 250 pounds per hour per square foot of liquid surface area.

12. The method of claim 10 wherein the power input to the agitator is at least sufficient to produce agitation in the reactor equivalent to that produced by an input of 0.003 HP per gallon of slurry in a 50 gal. reactor.

13. The method of claim 10 further including concentrating said slurry to its maximum solids content by passing the slurry through a settling zone wherein the slurry settles thereby forming a concentrated slurry and a liquid phase carbon dioxide layer, and withdrawing the concentrated slurry from the settling zone as product.

14. A continuous method for producing a refrigerant composition comprising a pumpable slurry consisting essentially of finely divided, small particles of solid carbon dioxide dispersed in liquid carbon dioxide, comprising withdrawing carbon dioxide vapor at a controlled rate from a vessel containing liquid carbon dioxide at the triple-point pressure of carbon dioxide to cause discrete non-agglomerated particles of solid carbon dioxide to be formed at an evaporating surface of the liquid while continuously agitating the liquid to prevent agglomeration of said particles as a crust, said rate of vapor withdrawal being controlled to produce a fluid and pumpable slurry of from 10% to 85% by weight of small, finely divided particles of solid carbon dioxide dispered in liquid carbon dioxide, said agitation being sufficient to remove said particles from said evaporating surface as said particles are formed while preventing agglomeration of the solid particles within the body of liquid, and continuously withdrawing slurry from the vessel and continuously introducing liquid carbon dioxide into the vessel under triple-point conditions of pressure and temperature at a rate corresponding to the rates at which solid and liquid are withdrawn as product slurry and vapor is withdrawn as by-product.

15. The method of claim 14 wherein the evaporation rate of the liquid carbon dioxide produces solid at a rate between about 20 and 250 pounds per hour per square foot of liquid surface area.

16. The method of claim 14 wherein the withdrawn slurry is concentrated by passing the withdrawn slurry through a settling zone wherein the slurry settles to form a concentrated slurry and a liquid layer, recycling liquid from the liquid layer to the vessel and withdrawing concentrated slurry from the settling zone as product.

* * * * *